United States Patent
Suzuki et al.

(10) Patent No.: US 6,800,384 B2
(45) Date of Patent: Oct. 5, 2004

(54) SYNTHETIC RESIN LEATHER

(75) Inventors: Masao Suzuki, Haibara-gun (JP);
Masao Sasaki, Haibara-gun (JP)

(73) Assignee: Okamoto Industries, Inc., Tokyo (JP)

( * ) Notice: Subject to any disclaimer, the term of this patent is extended or adjusted under 35 U.S.C. 154(b) by 0 days.

(21) Appl. No.: 10/117,215

(22) Filed: Apr. 8, 2002

(65) Prior Publication Data

US 2003/0190438 A1 Oct. 9, 2003

(51) Int. Cl.$^7$ .......................... B32B 3/00; B32B 27/00
(52) U.S. Cl. .................... 428/904; 428/480; 428/423.1; 428/518; 428/522; 428/523; 428/141; 428/142; 428/147; 428/151; 428/156; 428/161; 442/59; 442/304; 442/288; 442/293; 442/290; 442/396; 442/398; 442/399
(58) Field of Search .................... 428/904, 480, 428/423.1, 518, 522, 523, 141, 142, 147, 151, 156, 161; 442/59, 304, 288, 293, 290, 396, 398, 399

(56) References Cited

U.S. PATENT DOCUMENTS 4,190,572 A * 2/1980 Nishimura et al. ........ 264/46.4
4,992,507 A * 2/1991 Coogan et al. ............. 524/591

FOREIGN PATENT DOCUMENTS

| JP | 02-264086 | * 10/1990 | ............ D06N/7/02 |
| JP | 10-212675 | * 8/1998 | ............ D06N/3/00 |

* cited by examiner

*Primary Examiner*—Deborah Jones
*Assistant Examiner*—Ling X. Xu
(74) *Attorney, Agent, or Firm*—Sherman & Shalloway

(57) ABSTRACT

A synthetic resin leather comprising a substrate at least one surface of which is arranged with a synthetic resin layer, wherein said synthetic resin layer contains 1 to 70 weight parts of bridged polyalkylene oxide to 100 weight parts of synthetic resin. As the synthetic resin, polyvinyl chloride resin, acrylic soft resin, mixed resin composed of 50–95 wt. % of thermoplastic polyurethane and 50-5 wt. % of acrylic soft resin, copolymer of polyester resin or polyolefin resin can be used. A surface coating layer containing powder of natural organic substance can be arranged over the surface of synthetic resin layer of said synthetic resin leather. As the powder of natural organic substance, collagen can be desirably used. Further, on the surface of the synthetic resin leather, it is desirable to mark a pattern and to make the height of convex part of the pattern higher than 0.05 mm.

15 Claims, No Drawings

SYNTHETIC RESIN LEATHER

BACKGROUND OF THE INVENTION

1. Field of the Invention

The present invention relates to a synthetic resin leather prepared by arranging a synthetic resin layer on the surface of a substrate such as knit or woven fabric or soft type foam sheet, especially relates to a synthetic resin leather having good touch.

2. Description of the Prior Art

As the synthetic resin leather which is used as a material for car interior, bags and pouches or surface material of furniture, a synthetic resin leather prepared by arranging a synthetic resin layer on the surface of a sheet type substrate such knit fabric, woven fabric, non-woven fabric or soft type foam sheet is used. And said synthetic resin leather is required not only to have pliability and intensity but also to have good touch.

In general, since the synthetic resin leather is easily charged with electricity and the surface of which is easily contaminated by the electrostatic charge, it is not sufficient at the view point of moisture absorbing ability and moisture diffusing ability in comparison with the natural leather. Further, the synthetic resin leather has a cool touch like plastics, therefore, the touch of it is inferior to that of the natural leather. Many trials to make the touch of the synthetic resin leather to be similar to that of natural leather were tried, up to the present. The trial to blend the granulated powder of natural leather in the synthetic resin layer of a synthetic resin leather for the purpose to obtain similar touch to the natural leather is also one of the trial. However, in the case of said method, the process to granulate the natural leather to the shape and size suitable to be blended in the synthetic resin layer is very expensive, and further the inconsistent quality of the natural leather, which is associated with natural leather, is a problem.

BRIEF SUMMARY OF THE INVENTION

The present invention is carried out by taking the above mentioned circumference into consideration, and the object of the present invention is to provide a synthetic leather which is good at moisture absorbing ability and moisture diffusing ability, and having an excellent touch similar to the natural leather.

The present invention is a synthetic resin leather comprising a substrate at least one surface of which is arranged with a synthetic resin layer, wherein said synthetic resin layer contains 1 to 70 weight parts of bridged polyalkylene oxide to 100 weight parts of synthetic resin. As the synthetic resin, it is desirable to use polyvinyl chloride resin, acrylic soft resin, mixed resin composed of 50–95 wt. % of thermoplastic polyurethane and 50–5 wt. % of acrylic soft resin, copolymer of polyester resin or polyolefin resin. A surface coating layer containing powder of natural organic substance can be arranged over the surface of synthetic resin layer of said synthetic resin leather. As the powder of natural organic substance, collagen can be desirably used. Further, on the surface of the synthetic resin leather, it is desirable to mark a pattern and to make the height of convex part of the pattern higher than 0.05 mm.

DETAILED DESCRIPTION OF THE INVENTION

As the substrate of the synthetic resin leather of the present invention, knit or woven fabrics or non-woven fabrics can be used, and a material which does not loose pliability of the synthetic resin layer and which provides a proper intensity and bulky feeling is desirably used. The starting materials of these knit or woven fabrics is polyamide fiber, polyester fiber, polyacrylic fiber, polypropylene fiber, cotton, rayon or mixed spun yarn of these fibers. As the knit fabrics, double knit fabric or grey sheeting can be mentioned, and as woven fabrics, plane woven cloth, figured woven cloth or satin fabric can be mentioned. And as a substrate, a soft type foam sheet can be used. The substantial example of said soft type foam sheet, polypropylene foam, electron beam bridged polypropylene foam, polyethylene foam, electron beam bridged polyethylene foam or polyurethane foam can be mentioned. And as the substrate, a laminate of woven fabric, knit fabric or non-woven fabric with soft type foam sheet can be also used. In this case, it is desirable to form a structure of "woven, knit or non-woven fabric/soft type foam sheet/synthetic resin sheet".

As the substantial example of synthetic resin used in the present invention to form a synthetic resin layer, a pliable synthetic resin such as soft polyvinyl chloride, acrylic soft resin, mixed resin of thermoplastic polyurethane and acrylic soft resin, polyester copolymer or polyolefin resin can be mentioned.

Above mentioned soft polyvinyl chloride is prepared and softened by blending following plasticizer to polyvinyl chloride; namely, phthalic acid ester such as di2-ethylhexyl phthalate, isobutyl phthalate, diisodecyl phthalate, trimellitic acid ester such as 2-ethylhexyl trimellitate, epoxy plasticizer, such as epoxydated soybean oil, butyl epoxy stearate or phosphoric acid ester such as tricresyl phosphate.

Above mentioned acrylic soft resin is a resin which displays pliability like soft polyvinylchrloride at the room temperature. Said acrylic soft resin is desirable to be multi layered polymer, that is, more than two kinds of acrylic resin are forming core-shell type multi layered structure. These acrylic soft resin displays good pliability at the room temperature, has durability for bending and excellent weather resistance.

One example of acrylic soft resin is illustrated as follows. That is, acrylic soft resin of multi layered structure, comprising the combination of 10–90 weight parts of at least single layered polymer layer [A] whose Tg is lower than −20° C., prepared by polymerizing monomer mixture consisting of acrylic acid alkyl ester, polyfunctional bridgiable monomer and/or polyfunctional graft monomer, further adding methacrylic acid alkyl ester having alkyl group of carbon number 1 to 8 and/or copolymerable unsaturated monomer in case of necessity, and 90–10 weight parts of at least single layered polymer layer [B] whose Tg is from −20° C. to 50° C., prepared by polymerizing monomer mixture consisting of at least one kind of acrylic acid alkyl ester having alkyl group of carbon number 1 to 12, at least one kind of methacrylic acid alkyl ester having alkyl group of carbon number 1 to 8, further adding copolymerable unsaturated monomer in case of necessity, and the layer located at the outer most layer is polymer layer [B].

The other example of acrylic soft resin is illustrated as follows. Namely, the acrylic soft resin of multi layered structure comprising, 30–80 weight parts of rubber layer prepared by polymerizing acrylic acid alkyl ester having alkyl group of carbon number 1–8, polyfunctional monomer having at least two vinyl group or vinylidene group and monofunctional monomer having one copolymerable vinyl group in case of necessity and 20 to 70 weight parts of hard resin layer prepared by polymerizing methyl methacrylate, acrylic acid alkyl ester having alkyl group of carbon number 1–8 and/or monomer having copolymerable vinyl group or vinylidene group, and the layer located at the outer most layer is hard resin layer.

Further, the other example of acrylic soft resin is mentioned as follows. Namely, the acrylic soft resin of multi layered structure whose average particle size is from 0.01 μm to 3 μm comprising, (A) 5–30 weight parts of polymer layer locating at the inmost layer prepared by polymerizing monomer mixture consisting of methyl metacrylate, acrylic acid alkyl ester having alkyl group of carbon number 1–8; (B) 20–45 weight parts of polymer layer locating at the intermediate layer prepared by polymerizing monomer mixture consisting of acrylic acid alkyl ester having alkyl group of carbon number 1–8, polyfunctional grafting agent and methyl metacrylate and/or polyfunctional bridging agent; and (C) 50–75 weight parts of polymer layer locating at the outermost layer prepared by polymerizing monomer mixture consisting of methyl metacrylate and acrylic acid alkyl ester having alkyl group of carbon number 1–8.

And, when plasticizer is blended to the acrylic soft resin, the pliability and the touch of the product can be improved. As the plasticizer, phthalic acid ester such as di2-ethylhexyl phthalate, isobutyl phthalate, diisodecyl phthalate; trimellitic acid ester such as 2-ethylhexyl trimellitate; aliphatic dibasic acid ester such as DOA, DINA or DOS; epoxy plasticizer such as epoxydated soybean oil or butyl epoxystearate; phosphoric acid ester such as tricresyl phosphate; citric acid ester such as tributhyl acetyl citrate are used. Among these plasticizers, especially, aromatic carboxylic acid ester such as phthalic acid ester or trimellitic acid ester can be desirably used.

Further, above-mentioned mixed resin is a resin consisting of 50–95 wt. % of thermoplastic polyurethane and 50–5 wt. % of acrylic soft resin, desirably is a resin consisting of 60–90 wt. % thermoplastic polyurethane and 40–10 wt. % of acrylic soft resin, and more desirably is a resin consisting of 70–90 wt. % thermoplastic polyurethane and 30–10 wt. % of acrylic soft resin. As the acrylic soft resin, above mentioned resins can be used.

The thermoplastic polyurethane is the compound obtained by the reaction of diisocyanate compound with the compound having more than two hydroxyl groups. Especially, so called polyurethane thermoplastic elastomer (TPU) consisting of soft segment and hard segment, comprising long chain polyol, diisocyanate and chain extending agent, is desirably used. Among these, the thermoplastic polyurethane having resin hardness of 65–95 especially 70–80 indicated by Shore A hardness is desirably used.

As the diisocyanate compound used for the synthesis of thermoplastic polyurethane, for example, tolylene diisocyanate, diphenylmethane diisocyanate, naphthalene diisocyanate, tolidine diisocyanate, hexamethylene diisocyanate, xylylene diisocyanate, hydrogenated xylylene diisocyanate, hydrogeneted dixyclohexylmethane diisocyanate or isophorone diisocyanate are used. Further, as the compound having more than two hydroxyl group, polyester polyol which is the condensation product of dibasic acid such as adipic acid or phthalic acid with glycol such as 1,4-butane diol; polycarbonate polyol which is the reactive product of carbonate such as ethylene carbonate with glycol; polyether polyol such as polyethylene glycol, polypropylene glycol, polytetramethylene glycol or polyethylene glycol-polypropylene glycol are used. As the chain extending agent, low molecule polyhydric alcohol such as ethylene glycol, 1,2-propylene glycol, 1,3-propylene glycol, butane 1, 2 diol, butane 1, 3 diol, butane 1, 4 diol, butane 2, 3 diol or hexane diol, amine or water can be used.

When plasticizer is blended to above mentioned mixed resin, the pliability and the touch of the product can be improved. As the plasticizer, phthalic acid ester such as di2-ethylhexyl phthalate, isobutyl phthalate, diisodecyl phthalate; trimellitic acid ester such as 2-ethylhexyl trimellitate; aliphatic dibasic acid ester such as di-2ethylhexyl adipate, di-isononyladipate or di-2ethylhexyl sebacate; epoxy plasticizer such as epoxydated soybean oil or butyl epoxvstearate; phosphoric acid ester such as tricresyl phosphate; citric acid ester such as tributhyl acetyl citrate are used. Among these plasticizers, especially aromatic carboxylic acid ester such as phthalic acid ester or trimellitic acid esteris preferably used, from the view point that said plasticizers indicates excellent plasticizing effect and the bleeding of the plasticizer is not so serious. The blending amount of the plasticizer is 0–50 weight parts to 100 parts of mixed resin, desirably 3–20 weight parts. When the blending amount is too much, it causes a problem of bleeding and is not preferable.

Further, the above mentioned co-polymerized polyester is a random co-polymerized polyester using more than two kinds of polyvalent carboxylic acid or polyhydric alcohol to any one or both component of polyvalent carboxylic acid and polyhydric alcohol. As the substantial example of the component of polyvalent carboxylic acid, adipic acid, glutaric acid, succinic acid, suberic acid, azelaic acid, 1,4-cyclohexadicarboxylic acid, cyclohexan diacetic acid, terephthalic acid, ortho-phthalic acid, isophthalic acid, 2,6-naphthalene dicarboxaylic acid, 2,6-naphthalenedimethylenecarboxylic acid, paraphenylene dicarboxylic acid and trimellitic acid can be mentioned. As the substantial example of the component of polyhydric acid, ethylene glycol, 1,2-propylene glycol, 1,4-butanediol, 1,5-pentanediol, 1,6-hexanediol, diethyleneglycol, triethyleneglycol, tetramethyleneglycol, 2,2-dimethyl-trimethyleneglycol and hexamethyleneglycol can be mentioned. As the co-polymerized polyester, the polyester whose glass transition temperature (Tg) is smaller than 20, having pliability without containing a plasticizer is desirably used. Above mentioned acrylic soft resin can be blended to said co-polymerized polyester. As the commodity product to be purchased in the market, DC427 (Tg; 3–5° C.); product of Mithubishi Rayon or PETG6763 (Tg; 81° C.); product of Eastman Chemical can be mentioned.

As the polyolefin resin, the copolymer of olefin and polar monomer such as ethylene-alkyl(metha)acrylate copolymer, ethylene-vinylacetate copolymer or ethylene ionomer is desirably used. In a case of non-polar polyethylene or polypropylene, a compatibility accelerating agent is needed, because the compatibility of said compounds with the bridged polyalkylene oxide resin is not sufficient.

The bridged polyalkyleneoxide resin used in the present invention is illustrated readily as follows. This bridged polyalkyleneoxide resin can be obtained by bridging polyalkyleneoxide and diol using isocyanate compound as a bridging agent. This resin is desirable to have melting viscosity of 500 to 200,000 poise under the condition of 50 kg/cm$^2$ pressure at 170° C. and water absorbing ability (pure water g/resin g) of 10 to 45 g/g. Since this resin has an excellent water absorbing ability, the moisture absorbing ability of the synthetic resin layer containing said bridged polyalkyleneoxide is improved and also the touch becomes good.

As the polyalkyleneoxide consisting bridged polyalkyleneoxide resin, the one having weight-average molecule weight of 500 to 500,000 is used. For example, polyethyleleoxide, polypropyleneoxide, copolymer of ethyleneoxide/propyleneoxide, polybutyleneoxide or mixture of these compound can be used. Especially, polyethyleleoxide, polypropyleneoxide, copolymer of ethyleneoxide/propyleneoxide, polybutylene oxide or mixture of these compound having weight-average molecule weight of 2,00 to 100,000 is desirably used. When the weight-average molecule weight is under 500, the melting viscosity of the obtained bridged polyalkyleneoxide resin is too low, and when the weight-average molecule weight is larger than 500,000, the melting viscosity of the obtained bridged polyalkyleneoxide resin becomes remarkably high. And in both case, the compatibility of the obtained resin with other synthetic resin is deteriorated and consequently causes the problem that the moisture absorbing ability of the leather product is deteriorated.

And as a diol which consists bridged polyalkyleneoxide resin together with polyalkyleneoxide, an organic compound possessing 2 hydroxyl groups (—OH) in same molecule, for example, ethyleneglycol, diethyleneglycol, triethyleneglycol, tetraethyleneglycol, propyleneglycol, dipropyleneglycol, trimethyleneglycol, 1,3-butanediol, 2,3-butanediol, 1,4-butanediol, 1,5-pentandiol, hexyleneglycol, octyleneglycol, glycerylmonoacetate, glycerylmonobutylate, 1,6-hexanediol, 1,9-nonanediol and bisphenol A can be mentioned. Desirably, ethyleneglycol, propyleneglycol, 1,4-butanediol, 1,6-hexanediol or 1,9-nonanediol is used.

An isocynanate compound which is used to bridge above mentioned polyalkyleneoxide and diol is an organic compound possessing two isocyanate groups in same molecule. For example, urethane isocyanate compound obtained by reacting corresponding mole numbers of diisocyanate to the active hydrogen numbers of polyol such as xylilene diisocyanate, 4,4'-diphenylmethane diisocyanate, hexamethylene diisocyanate, dicyclohexylmethane diisocyanate, 1,3-dimethylbenzol-2,4-diisocyanate, 2,4-tolylenediisocyanate (TDI), trimer of TDI, polymethylene polyphenyl isocyanate or trimethylol propane and polyisocyanate adduct can be mentioned. Among these compounds, 4,4'-diphenylmethane diisocyanate, dicyclohexylmethane diisocyanate, hexamethylene diisocyanate or 2,4-tolylenediisocyanate can be desirably used.

The using ratio of above mentioned polyalkyleneoxide, diol and isocynanate compound is within the limits mentioned below. That is, the ratio (R value) of the sum numbers of end hydroxyl group which polyalkyleneoxide has and hydroxyl group which diol has to the numbers of isocyanate group which isocyanate compound has (—NCO group/—OH group) is within the limits of 0.5 to 2.0. The preferable limit is 0.8 to 1.7. When R value is under 0.5, the bridging density is too low to obtain the bridged polyalkyleneoxide resin showing sufficient water absorbing ability, and when R value is larger than 2.0, the bridging density becomes high and consequently melting density becomes higher, therefore the compatibility of the resin with other synthetic resins is deteriorated.

The synthetic resin leather of the present invention is prepared according to the following process.

As the first step, resin composition which is used as the starting material of the synthetic resin layer is prepared. As the substantial example of the preparation process of this resin composition, following process can be mentioned. Namely, prescribed amount of synthetic resin and bridged polyalkyleneoxide resin, further preferred additives are mixed, then kneaded using a kneader or a roller and aimed resin composition is obtained. Slipping agent, ultra violet ray absorbing agent, pigment or antimicrobial agent can be used as an additive. As a slipping agent, fatty acid metal salt e.g. calcium, magnesium, zinc or barium salt of stearic acid, polyethylene wax, stearic acid or alkylene bis fatty acid amide can be used. As an ultra violet ray absorbing agent, benzotriazol or salicylate ultra violet ray absorbing agent can be used. As an antimicrobial agent, the inorganic silver containing antimicrobial agent can be used.

As the second step, the obtained resin composition is formed to a sheet of 0.1 mm to 5 mm thickness by a calender roller or a extrusion press. Adhesive is coated on the surface of fabric substrate, then to the coated surface said formed synthetic resin sheet is piled up, lightly heat-pressed and lightly adhered to prevent the shifting. Then, marble print is performed on the surface if necessary, and heat-pressed by a roller heated to the temperature of 150° C. to 200° C. By this heat-pressing process by a roller, the substrate and the synthetic resin sheet becomes one body, thus the synthetic resin leather is obtained.

As an adhesive to adhere the substrate and the synthetic resin sheet, ethylene-vinyl acetate polymer emulsion, polyvinyl chloride paste or two liquid type polyurethane adhesive can be used. This adhesive can be coated both on the surface of substrate or on the surface of synthetic resin sheet. In a case when a soft foam sheet such as polypropylene foam is arranged between the fabric substrate and the synthetic resin layer, adhesives necessary to adhere the substrate and the polypropylene foam sheet and to adhere the polypropylene foam sheet and the synthetic resin sheet are arranged. In said case, for the purpose to improve the adhering intensity, a primer layer such as polyurethane primer layer or epoxy resin primer layer can be provided on the piled surface of the polypropylene foam sheet.

Further, on the both surface of the substrate, synthetic resin layer can be provided. A soft foam sheet such as polypropylene foam sheet can be previously adhered to the fabric substrate using adhesive, then a synthetic resin layer can be formed on the surface of this soft foam sheet so as to prepare a leather. According to the kind of synthetic resin of synthetic resin layer and the kind of material of the substrate, it is possible to adhere both sheets by a heat laminate process which is characterized by simple heat-pressing, without using adhesive.

In the process to make the substrate and the synthetic resin sheet one body by heat-pressing using above mentioned heat roller, a patterned roller can be used as the heat roller. By the use of this patterned roller, a pattern can be provided to the surface of leather simultaneously with the process to make one body. By providing a pattern to the surface of leather, the touch of leather can be improved. The height from the bottom of concave part of the pattern to the top of convex part is desirable to be higher than 0.05 mm. The leather pattern having the height higher than 0.05 mm is superior to the leather pattern having the height lower than 0.05 mm (satin finish) at the view point of touch. Especially, leather pattern having the height higher than 0.2 mm is desirable.

For the purpose to improve the lustrous and touch, a surface coating layer can be formed on the surface of synthetic resin leather of the present invention. The thickness of the surface coating layer is ordinary from 1 to 30 $\mu$m, and desirably from 1 to 10 $\mu$m. As the resin which can be used for the surface coating layer, urethane resin or acrylic resin can be mentioned. The urethane resin used for the surface coating layer, is the reaction product of organic diisocyanate and polyol, and the chain of said reaction product can be extended by diamine if necessary. As the isocyanate component, tolylene 2,4-diisocyanate, 4,4-diphenylmethanediisocyanate, 1,6-hexamethylene diisocyanate or 1,4-cyclohexanediisocyanete can be mentioned. As the polyol component, polyetherpolyol such as polyethyleneglycol, polypropyleneglycol or polytetraethyleneglycol; or polyesterpolyol such as reaction product of diol e.g. ethyleneglycol or propyleneglycol and divalent acid e.g. adipic acid or sebacic acid or ring compound such as caprolactam can be used.

The main component of the acrylic resin used for said surface coating layer is acrylic acid and esters thereof, acrylic amide, acrylonitrile, methacrylic acid and esters thereof or copolymers of said compounds with other acrylate or vinyl monomer. As the substantial example of acrylic acid ester, methylacrylate, ethylacrylate, butylacrylate, 2-ethylhexcylacrylate, cyanomethylacrylate, cyanoethyleacrylqte, cyanobutylacrylate or cyano-2-ethylhexcylacrylate can be mentioned. As the substantial example of methacrylic acid ester, methylmethacrylate, ethylmethactylate, butylmethacrylate, 2-ethylhexylmethacrylate, cyanomethylmethacrylate, cyanoethylmethacrylate, cyanobutylmethacrylate, cyano-2-ethylhexylmethaacrylate can be mentioned.

To the synthetic resin used for the surface coating layer (urethane resin, acrylic resin) silicone type compound can be added. By adding the silicone type compound, touch of the leather can be improved. Further, when the powder of natural organic compound is contained in the synthetic resin of the surface coating layer, moisture absorbing ability and moisture diffusing ability can be further improved and the touch is also improved. As the substantial example of said natural organic compound, silk, cellulose, collagen, wool, keratin, linen, cotton, chitin, chitosan, betaine or eggshell membrane can be mentioned. These compounds can be used together with. Among these compounds, collagen is desirable used, because collagen has especially good touch. Collagen has an excellent moisture absorbing ability and moisture diffusing ability and even if it absorb moisture, it does not become sticky. The content of natural organic compound is normally 1 to 90 wt. %, desirably 3 to 60 wt. %, more desirably 5 to 30 wt. %. When the content of natural organic compound is larger than 90 wt. %, the softness of resin is hurt. The average particle size of the natural organic compound powder (measured by LMS-24; product of Seishin Kigyo Co., Ltd.) is smaller than 300 $\mu$m, desirably 1 to 100 $\mu$m, more desirably 3 to 30 $\mu$m. When the particle size is larger than 300 $\mu$m, the good touch can not be obtained.

The synthetic resin leather of the present invention has good softness and is excel in moisture absorbing ability and moisture diffusing ability. From the view point of touch, it has a similar or same touch to a natural leather, further some kind of the synthetic resin leather of the present invention shows the touch like baby's skin. And the synthetic resin leather of the present invention can be applied to car interior (seat, headless, tonneau cover, sun visor, celling, instrument panel or door), interior finishing material for inner door, covering material of motorcycle saddle, surface materials for furniture (chair or settee), materials for bags and pouches, rain coat or apron. Further, the sheet prepared by arranging soft vinyl chloride resin layer to the both surface of fabric substrate can be used as the material for a flexible container.

EXAMPLE

The present invention will be understood more readily with reference to the Examples and the Comparative Examples, however, these are only intended to illustrate the invention and not be construed to limit the scope of the invention.

Examples 1–7, Comparative Example 1

Acrylic soft resin (SA1000P: Product of Kuraray Co., Ltd.), thermoplastic polyurethane (UHE-75, Shore hardness 75: Product of Mitsubishi Chemicals Co., Ltd.), copolymerized polyester resin (DC427: Product of Mitsubishi Rayon Co., Ltd. ), polyolefin resin [ethylene-methacrylate copolymer (ethylene 80 wt. %), WH-206: Product of Sumitomo Chemical Industries Co., Ltd.], partially bridged nitrile rubber (Nipol Dn214: product of Nihon Zeon Co., Ltd.), polyvinyl chloride (degree of polymerization, 1100), bridged polyalkyleneoxide resin (Aqua Calk FW: product of Sumitomo Seika Co., Ltd.), plasticizer tri2-ethylhexyl trimellitate, Ba—Zn complex stabilizer, partially esterficated phosphoric acid slipping agent, phosphoric acid ester slipping agent(AX-38: product of Asahi Denka Kogyo Co., Ltd.), calcium carbonate, diantimony trioxide and pigment are blended according to the component ratio shown in Example 1–7 and Comparative Example 1 of Table 1. This blended substance is formed to the sheet of 0.35 mm thickness by calendering method. Two liquid type polyurethane adhesive is coated over the surface of a grey sheeting made of polyester fiber. To the coated surface, above mentioned calender finished sheet is piled up, lightly heat-pressed and lightly adhered to prevent the shifting, then heat-pressed by a patterned roller heated to 180° C., and the grey sheeting and the synthetic resin sheet become one body. Thus, the synthetic resin leather of the present invention having a pattern of 0.22 mm height is obtained.

The obtained synthetic resin leather is left in the atmosphere of 23° C. temperature and 65% relative humidity for 24 hours, and the touch of each specimen are evaluated. Evaluation is carried out by ⊚, ○, Δ and X. ⊚ is a touch of baby's skin, ○ is a touch of natural leather, Δ is a touch similar to natural leather and X is a touch of general synthetic resin leather. The obtained results are summarized in Table 1.

The blended composition is formed to a sheet of 0.3 mm thickness (sheet B) using a calendering machine.

As the substrate, the interlock stitch knit fabric made of mixed spun yarn of rayon staple fiber and polyester staple fiber of 30 yarn number count is used. To the both surface of said knit fabric, 2 liquid type polyurethane adhesive is coated. To the coated surface, above mentioned calender finished sheet A is piled up, lightly heat-pressed and lightly adhered to prevent the shifting. Then, above mentioned calender finished sheet B is further piled up, lightly heat-pressed and lightly adhered to prevent the shifting. After that, heated to the temperature of 200° C. and foamed sheet B. Heat pressed by a pattern roller and obtained a leather with 0.15 mm height. Further, to the surface of which,

TABLE 1

|  | Example | | | | | | | Comparative Example |
| --- | --- | --- | --- | --- | --- | --- | --- | --- |
|  | 1 | 2 | 3 | 4 | 5 | 6 | 7 | 1 |
| acrylic soft resin | 100 | 20 | 20 | | | | | |
| thermo plastic polyurethane | | 80 | | | | | | |
| polyester resin copolymer | | | 80 | | | | | |
| polyolefin resin | | | | 100 | | | | |
| partially bridged nitrile rubber | | | | 20 | | | | |
| polyvinyl chloride resin | | | | | 100 | 100 | 100 | 100 |
| bridged polyalkylene oxide resin | 10 | 10 | 10 | 10 | 10 | 3 | 30 | |
| tri2-ethylhexyl trimellitate | | | 20 | | 80 | 80 | 80 | 80 |
| calcium carbonate | | | | | 18 | 18 | 18 | 18 |
| diantimony trioxide | | | | | 4 | 4 | 4 | 4 |
| Ba-Zn complex stabilizer | | | | | 3 | 3 | 3 | 3 |
| partially esterficated phosphoric acid slipping agent | 1 | 1 | 1 | | | | | |
| phosphoric acid ester slipping agent | | | | 1 | | | | |
| pigment | small | small | small | small | small | small | small | small |
| (touch estimation) | ○ | ○ | ○ | ○ | ○ | Δ | ○ | X |

Example 8

100 weight parts of polyvinyl chloride (degree of polymerization; 1100), 80 weight parts of plasticizer tri2-ethylhexyl trimellitate, 18 weight parts of calcium carbonate, 2 weight parts of diantimony trioxide, 4 weight parts of foaming agent diazocarbonamide, 3 weight parts of Ba—Zn complex stabilizer and small part of pigment are blended. The blended composition is formed to a sheet of 0.3 mm thickness (sheet A) using a calendering machine. 100 weight parts of polyvinyl chloride (degree of polymerization; 1100), 10 weight parts of bridged polyalkyleneoxide resin (Aqua Calk FW: Product of Sumitomo Seika Co., Ltd.), 80 weight parts of plasticizer tri2-ethylhexyl trimellitate, 18 weight parts of calcium carbonate, 2 weight parts of diantimony trioxide, 3 weight parts of Ba—Zn complex stabilizer and small part of pigment are blended. The blended composition is formed to a sheet of 0.3 mm thickness (sheet B) using a calendering machine.

solvent solution of silicone co-polymerized polyurethane (Leatheroid LU-692: product of Dainichi Seika Co., Ltd.) containing 30 wt. % of collagen powder (Toriazetto: product of Showa Denko Co., Ltd.) is coated so as the coated amount to be 8 g/m$^2$ (after dried). The touch of the obtained leather is evaluated by the same measuring method to Example 1. The evaluation result of the obtained leather is ⊚.

Examples 9–13, Comparative Example 2

To the surface of synthetic resin leathers obtained in Example 1, Example 2, Example 3, Example 4, Example 5, Example 6, Example 7 and Comparative Example 1 solvent solution of silicone co-polymerized polyurethane (Leatheroid LU-692: product of Dainichi Seika Co., Ltd.) containing 30 wt. % of collagen powder (Toriazetto: product of Showa Denko Co., Ltd.) is coated so as the coated amount to be 8 g/m$^2$ (after dried). Thus the synthetic resin leathers of Example 9 (surface coated example of synthetic resin leather obtained in Example 1), Example 10 (surface coated example of synthetic resin leather obtained in Example 2), Example 11 (surface coated example of synthetic resin leather obtained in Example 3), Example 12 (surface coated example of synthetic resin leather obtained in Example 4), Example 13 (surface coated example of synthetic resin leather obtained in Example 5), Example 14 (surface coated example of synthetic resin leather obtained in Example 6), Example 15 (surface coated example of synthetic resin leather obtained in Example 7) and Comparative Example 2 (surface coated example of synthetic resin leather obtained in Comparative Example 1) are obtained.

The touch of these obtained synthetic leather are evaluated by same method to Example 1. The evaluation results of synthetic leathers obtained in Examples 9–13 and 15 are ⊙. The evaluation results of synthetic leathers obtained in Examples 14 is ○. Further, the evaluation results of synthetic leathers obtained in Comparative Example 2 is X.

What is claimed is:

1. A synthetic resin leather comprising a substrate at least one surface of which is arranged with a synthetic resin layer,
wherein said synthetic resin layer contains 1 to 70 weight parts of bridged polyalkylene oxide resin to 100 weight parts of synthetic resin
wherein said bridged polyalkylene oxide resin has a water absorbing capacity in grams of pure water per grams of resin from 10 to 45.

2. The synthetic resin leather of claim 1, wherein synthetic resin is polyvinyl chloride.

3. The synthetic resin leather of claim 1, wherein synthetic resin is acrylic type soft resin.

4. The synthetic resin leather of claim 1, wherein synthetic resin is a mixed resin consisting of 50 to 95 wt. % of thermoplastic polyurethane and 50 to 5 wt. % of acrylic soft resin.

5. The synthetic resin leather of claim 1, wherein synthetic resin is copolymerized polyester resin.

6. The synthetic resin leather of claim 1, wherein synthetic resin is polyolefin resin.

7. The synthetic resin leather according to claim 1, wherein the substrate is woven fabric or knit fabric.

8. The synthetic resin leather of claim 7, wherein the surface of which is patterned and, the height of the convex part of the pattern is higher than 0.05 mm.

9. The synthetic resin leather according to claim 7, wherein the synthetic resin is polyvinyl chloride, an acrylic type soft resin, a mixed resin consisting of 50 to 95 wt % of thermoplastic polyurethane and 50 to 5 wt % of acrylic soft resin, a copolymerized polyester resin, or a polyolefin resin.

10. The synthetic resin leather according to claim 1, wherein a surface coating layer containing powder of natural organic substance is arranged on the surface of the synthetic resin layer.

11. The synthetic resin leather of claim 10, wherein the powder of natural organic substance is the powder of collagen.

12. The synthetic resin leather of claim 10, wherein the surface of which is patterned and the height of the convex part of the pattern is higher than 0.05 mm.

13. The synthetic resin leather according to claim 11, wherein the synthetic resin is polyvinyl chloride, an acrylic type soft resin, a mixed resin consisting of 50 to 95 wt % of thermoplastic polyurethane and 50 to 5 wt % of acrylic soft resin, a copolymerized polyester resin, or a polyolefin resin.

14. The synthetic resin leather according to claim 1, wherein the surface is patterned and the height of the convex part of the pattern is higher than 0.05 mm.

15. The synthetic resin leather according to claim 14, wherein the synthetic resin is polyvinyl chloride, an acrylic type soft resin, a mixed resin consisting of 50 to 95 wt % of thermoplastic polyurethane and 50 to 5 wt % of acrylic soft resin, a copolymerized polyester resin, or a polyolefin resin.

* * * * *